(12) United States Patent
Kwon

(10) Patent No.: US 7,636,308 B2
(45) Date of Patent: Dec. 22, 2009

(54) CONTROLLING PACKET CONGESTION

(75) Inventor: Il-Won Kwon, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 763 days.

(21) Appl. No.: 11/033,536

(22) Filed: Jan. 12, 2005

(65) Prior Publication Data

US 2005/0195740 A1    Sep. 8, 2005

(30) Foreign Application Priority Data

Mar. 3, 2004    (KR)    ............. 10-2004-0014434

(51) Int. Cl.
G06F 11/00 (2006.01)
G06F 15/00 (2006.01)
H04J 3/16 (2006.01)
H04L 1/00 (2006.01)
H04L 12/26 (2006.01)

(52) U.S. Cl. .................... 370/230.1; 370/252

(58) Field of Classification Search .......... 370/229, 370/235, 389, 401, 230.1, 252
See application file for complete search history.

(56) References Cited

U.S. PATENT DOCUMENTS

| | | | |
|---|---|---|---|
| 5,090,011 | A | 2/1992 | Fukuta et al. |
| 5,838,677 | A | 11/1998 | Kozaki et al. |
| 6,205,149 | B1 | 3/2001 | Lemaire et al. |
| 6,252,848 | B1 | 6/2001 | Skirmont |
| 6,515,963 | B1 | 2/2003 | Bechtolsheim et al. |
| 6,556,578 | B1 * | 4/2003 | Silberschatz et al. ........ 370/412 |
| 6,671,258 | B1 | 12/2003 | Bonneau |
| 6,724,721 | B1 | 4/2004 | Cheriton |
| 6,829,649 | B1 * | 12/2004 | Shorey et al. ............... 709/235 |

(Continued)

FOREIGN PATENT DOCUMENTS

KR    2000-0026836    5/2000

(Continued)

OTHER PUBLICATIONS

West et al, "TCP/IP Field Behavior", draft-ietf-rohc-tcp-field-behavior-00.txt, Mar. 21, 2002.*

(Continued)

Primary Examiner—Seema S Rao
Assistant Examiner—Jianye Wu
(74) Attorney, Agent, or Firm—Robert E. Bushnell, Esq.

(57) ABSTRACT

A packet congestion control technique employs an Active Flow Random Early Drop (AFRED) method to provide a service requiring a predetermined bandwidth with a stable Quality of Service (QoS) even when network congestion occurs. The packet congestion control technique includes: receiving at least one packet flow; defining identifiers for the received at least one packet flow; numbering each of the defined at least one packet flow; calculating a queue length of each of the at least one packet flow; allocating a maximum queue threshold value, a minimum queue threshold value, and a maximum probability value of each of the at least one packet flow; and dropping or accepting an incoming packet of a flow according to the calculated packet drop probability upon a queue length of a currently received packet being between the maximum queue threshold value and the minimum queue threshold value.

16 Claims, 6 Drawing Sheets

U.S. PATENT DOCUMENTS

| | | |
|---|---|---|
| 6,909,693 B1 * | 6/2005 | Firoiu et al. ................ 370/235 |
| 6,985,442 B1 * | 1/2006 | Wang et al. ................ 370/232 |
| 2002/0009051 A1 | 1/2002 | Cloonan |
| 2003/0007454 A1 * | 1/2003 | Shorey ....................... 370/229 |
| 2003/0088690 A1 | 5/2003 | Zuckerman et al. |
| 2003/0214954 A1 * | 11/2003 | Oldak et al. ................ 370/400 |
| 2003/0223362 A1 | 12/2003 | Mathews et al. |
| 2003/0231593 A1 | 12/2003 | Bauman et al. |
| 2004/0071086 A1 * | 4/2004 | Haumont et al. ........... 370/230 |
| 2004/0120252 A1 * | 6/2004 | Bowen et al. ............... 370/229 |

FOREIGN PATENT DOCUMENTS

KR    2002-0058765    7/2002

OTHER PUBLICATIONS

Dong Lin and Robert Morris, Proceedings of SIGCOMM'97, "Dynamics of Ramdom Early Detection", Dong Lin and Robert Morris, Proceedings of SIGCOMM'97, Oct. 1997.*

Korean Office action corresponding to Korean Patent Application No. 2004-0014434, issued on Nov. 29, 2005.

* cited by examiner

CONTROLLING PACKET CONGESTION

CLAIM OF PRIORITY

This application makes reference to, incorporates the same herein, and claims all benefits accruing under 35 U.S.C. §119 from an application for PACKET CONGESTION CONTROL METHOD FOR SECURING VIDEO SERVICE BANDWIDTH earlier filed in the Korean Intellectual Property Office on 3 Mar. 2004 and there duly assigned Serial No. 2004-14434.

BACKGROUND OF THE INVENTION

1. Field of the Invention

The present invention relates to controlling packet congestion. More particularly, the present invention relates to controlling packet congestion in which fair queuing of packets is effected using an Active Flow Random Early Drop (AFRED) method to guarantee Quality of Service (QoS).

2. Description of the Related Art

A typical method of resolving a congestion problem on the Internet is to control a transmission rate through a window size of a transmitting host in response to congestion which has already occurred and which depends on only both ends TCP hosts. However, since this method is unable to resolve the congestion which has already occurred, it is not sufficient to cope with an explosive traffic increase that the Internet has undergone.

When the congestion has already occurred, a queue length in a router buffer located at a congestion spot has already reached a maximum value, and so all packets following the congestion are dropped. Thus, all transmission hosts which have transmitted the packets almost simultaneously enter a slow start mode which reduces a window size, whereby a rate using a link falls.

In order to solve such problems, there is a need for a technique of actively coping with congestion before it occurs by managing buffers of a router (or gateway) which is an intermediate node, together with a current source based congestion control technique which controls a transmission rate of the end transmission hosts on the network. This can not only prevent the link use rate from falling but also always keeps a short queue length in the router.

An important objective of a congestion control technique is to maintain a small queue length at an intermediate node since a queuing delay of a network intermediate node greatly affects a total packet processing rate as it goes to a high speed network.

Various techniques for network congestion control have been proposed including a round robin scheduling technique to allocate a fair bandwidth to respective data streams.

However, a data stream can be allocated too much bandwidth or no bandwidth since a limited bandwidth is used.

In the typical per-flow queuing method, separated queues for respective flows are prepared, and the separated queues are separately managed according to a round robin scheduling method. Thus, fair queuing is possible since the queues are managed by the round robin scheduling method. A system which uses the per-flow queuing has advantages of not only reducing a packet loss problem resulting from congestion but also reducing buffer requirements. On the other hand, there is also a disadvantage in that because the separated queues must be managed based on each flow in the equipment, it is difficult to implement a fair allocation mechanism.

In a FIFO method, all flows flow into a single queue, and the flows are not separately managed. When congestion occurs, a packet is dropped so that a sender can be notified of the congestion, and a gateway (or router) can anticipate a network state by monitoring a queue length. If the queue length is long and an incoming packet is dropped, the sender reacts to such a packet loss. Such a simple packet management method is called the Drop Tail method. That is, this method drops an incoming packet when a buffer is completely filled. This means that a packet transmission rate depends on the performance of a link.

As a method of solving the Drop Tail problem, there is a concept of anticipating and detecting a congestion situation on the network in advance at an intermediate node and then informing the sender of the congestion. The sender is warned of a packet loss in advance so that the sender can adjust a transmission rate when a packet is forcibly dropped due to the network congestion.

This concept is known as "congestion avoidance" method. A purpose of the congestion avoidance method is to prevent an excessive queue size to thereby reduce the packet loss and to make a small size queue adequately use a non-used bandwidth of the link, thereby enabling the communication network to be optimally used. One of such strategies is a Random Early Detection (RED) method proposed by the Internet Engineer Task Force (IETF).

The RED method determines a congestion level of a network according to an average queue length and then calculates a packet drop probability. The RED method has a higher link use rate than the Drop Tail method.

The RED method enables an adequate use of a buffer by observing an average size of a queue. When the average queue size exceeds a previously set threshold size, the packets are randomly selected to be dropped or marked, thereby preventing the network from reaching a congestion state.

However, when the packets are dropped by the RED method, the packets may be processed without considering fairness for respective flows or any specialty for specific service (e.g., video service). This is because the RED method is based on the FIFO method.

Also, the parameters used in the RED method do vary according to a network condition and are fixed values which are set at an initial stage, and the packets are processed (dropped or accepted) based on these fixed values. Thus, it is impossible to take adequate measures for packet flows which need a predetermined bandwidth such as a video service.

The following patents each discloses features in common with the present invention but do not teach or suggest the inventive features specifically recited in the present claims: U.S. patent application No. 2002/0009051 to Cloonan, entitled CONGESTION CONTROL IN A NETWORK DEVICE HAVING A BUFFER CIRCUIT, published on Jan. 24, 2002; U.S. Pat. No. 5,838,677 to Kozaki et al., entitled SWITCHING SYSTEM HAVING MEANS FOR CONGESTION CONTROL BY MONITORING PACKETS IN A SHARED BUFFER AND BY SUPPRESSING THE READING OF PACKETS FROM INPUT BUFFERS, issued on Nov. 17, 1998; U.S. Pat. No. 5,090,011 to Fukuta et al., entitled PACKET CONGESTION CONTROL METHOD AND PACKET SWITCHING EQUIPMENT, issued on Feb. 18, 1992; U.S. Pat. No. 6,724,721 to Cheriton, entitled APPROXIMATED PER-FLOW RATE LIMITING, issued on Apr. 20, 2004; U.S. Pat. No. 6,671,258 to Bonneau, entitled DYNAMIC BUFFERING SYSTEM HAVING INTEGRATED RANDOM EARLY DETECTION, issued on Dec. 30, 2003; U.S. Pat. No. 6,556,578 to Silberschatz et al. entitled EARLY FAIR DROP BUFFER MANAGEMENT METHOD, issued on Apr. 29, 2003; U.S. Pat. No. 6,252,848 to Skirmont, entitled SYSTEM PERFORMANCE IN A DATA NETWORK THROUGH QUEUE MANAGEMENT BASED ON INGRESS RATE MONITORING, issued on Jun. 26, 2001; U.S. Pat. No. 6,515,963 to Bechtolsheim et al. entitled PER-FLOW DYNAMIC BUFFER MANAGEMENT, issued on Feb. 4, 2003; U.S. Pat. No. 6,205,149 to Lemaire et al. entitled QUALITY OF SERVICE CONTROL MECHANISM AND APPARATUS, issued on Mar. 20, 2001; U.S. patent application No. 2004/0071086 to Haumont et al. entitled TRAFFIC CONGESTION, published on Apr. 15, 2004; U.S. patent application No. 2003/0231593 to Bauman et al. entitled FLEXIBLE MULTILEVEL OUTPUT TRAFFIC CONTROL, published on Dec. 18, 2003; U.S. patent application No. 2003/0223362 to Mathews et al. entitled RANDOM EARLY DROP WITH PER HOP BEHAVIOR BIASING, published on Dec. 4, 2003; U.S. patent application No. 2003/0088690 to Zuckerman et al. entitled ACTIVE QUEUE MANAGEMENT PROCESS, published on May 8, 2003; and U.S. patent application No. 2003/0007454 to Shorey, entitled TRAFFIC MANAGEMENT IN PACKET-BASED NETWORKS, published on Jan. 9, 2003.

SUMMARY OF THE INVENTION

It is an object of the present invention to provide a packet congestion control method which provides services which need a predetermined bandwidth with a stable Quality of Service (QoS) even when network congestion occurs by using an Active Flow Random Early Drop (AFRED) method.

In order to achieve the object, the present invention provides a packet congestion control method comprising: receiving at least one packet flow; defining identifiers for the received at least one packet flow; numbering each of the defined at least one packet flow; calculating a queue length of each of the at least one packet flow; setting a packet drop probability for each of the at least one packet flow; and dropping or accepting an incoming packet of a flow according to the set packet drop probability.

In order to achieve the object, the present invention also provides a packet congestion control method comprising: receiving at least one packet flow; defining identifiers for the received at least one packet flow; numbering each of the defined at least one packet flow; calculating a queue length of each of the at least one packet flow; allocating a maximum queue threshold value, a minimum queue threshold value, and a maximum probability value for each of the at least one packet flow; setting a packet drop probability for each of the at least one packet flow; and dropping or accepting an incoming packet of a flow according to the set packet drop probability upon a queue length of a currently received packet being between the maximum queue threshold value and the minimum queue threshold value.

In order to achieve the object, the present invention further provides a packet congestion control method comprising: receiving at least one packet flow; defining identifiers for the received at least one packet flow; numbering each of the defined at least one packet flow; calculating a queue length of each of the at least one packet flow; allocating Random Early Detection (RED) parameters for each of the at least one packet flow; calculating a packet drop probability using the allocated RED parameters; and dropping or accepting an incoming packet of a flow according to the calculated packet drop probability.

In order to achieve the object, the present invention still further provides a packet congestion control method comprising: receiving at least one packet flow; defining identifiers for the received at least one packet flow; numbering each of the defined at least one packet flow; calculating a queue length of each of the at least one packet flow; allocating a maximum queue threshold value, a minimum queue threshold value, and a maximum probability value for each of the at least one packet flow; and dropping or accepting an incoming packet of a flow according to the calculated packet drop probability upon a queue length of a currently received packet being between the maximum queue threshold value and the minimum queue threshold value.

Each identifier is preferably defined according to a traffic class classified by an Internet Protocol (IP) processing bit.

Upon the at least one packet flow having burst characteristics, the minimum queue threshold value is increased to maintain a high use efficiency of a link, and the maximum queue threshold value is allocated to be as small as possible and at least twice as great as the minimum queue threshold value.

Upon the at least one packet flow having severe burst characteristics, the maximum probability value is increased to increase a packet drop rate.

In order to achieve the object, the present invention provides a program storage device, readable by a machine, tangibly embodying a program of instructions executable by the machine to perform a packet congestion control method comprising: receiving at least one packet flow; defining identifiers for the received at least one packet flow; numbering each of the defined at least one packet flow; calculating a queue length of each of the at least one packet flow; setting a packet drop probability for each of the at least one packet flow; and dropping or accepting an incoming packet of a flow according to the set packet drop probability.

In order to achieve the object, the present invention also provides a program storage device, readable by a machine, tangibly embodying a program of instructions executable by the machine to perform a packet congestion control method comprising: receiving at least one packet flow; defining identifiers for the received at least one packet flow; numbering each of the defined at least one packet flow; calculating a queue length of each of the at least one packet flow; allocating a maximum queue threshold value, a minimum queue threshold value, and a maximum probability value for each of the at least one packet flow; setting a packet drop probability for each of the at least one packet flow; and dropping or accepting an incoming packet of a flow according to the set packet drop probability upon a queue length of a currently received packet being between the maximum queue threshold value and the minimum queue threshold value.

In order to achieve the object, the present invention further provides a program storage device, readable by a machine, tangibly embodying a program of instructions executable by the machine to perform a packet congestion control method comprising: receiving at least one packet flow; defining identifiers for the received at least one packet flow; numbering each of the defined at least one packet flow; calculating a queue length of each of the at least one packet flow; allocating Random Early Detection (RED) parameters for each of the at least one packet flow; calculating a packet drop probability using the allocated RED parameters; and dropping or accepting an incoming packet of a flow according to the calculated packet drop probability.

In order to achieve the object, the present invention still further provides a program storage device, readable by a machine, tangibly embodying a program of instructions executable by the machine to perform a packet congestion control method comprising: receiving at least one packet flow; defining identifiers for the received at least one packet flow; numbering each of the defined at least one packet flow; calculating a queue length of each of the at least one packet flow; allocating a maximum queue threshold value, a minimum queue threshold value, and a maximum probability value for each of the at least one packet flow; and dropping or accepting an incoming packet of a flow according to the calculated packet drop probability upon a queue length of a currently received packet being between the maximum queue threshold value and the minimum queue threshold value.

Each identifier is preferably defined according to a traffic class classified by an Internet Protocol (IP) processing bit.

Upon the at least one packet flow having burst characteristics, the minimum queue threshold value is increased to maintain a high use efficiency of a link, and the maximum queue threshold value is allocated to be as small as possible and at least twice as great as the minimum queue threshold value.

Upon the at least one packet flow having severe burst characteristics, the maximum probability value is increased to increase a packet drop rate.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1A:
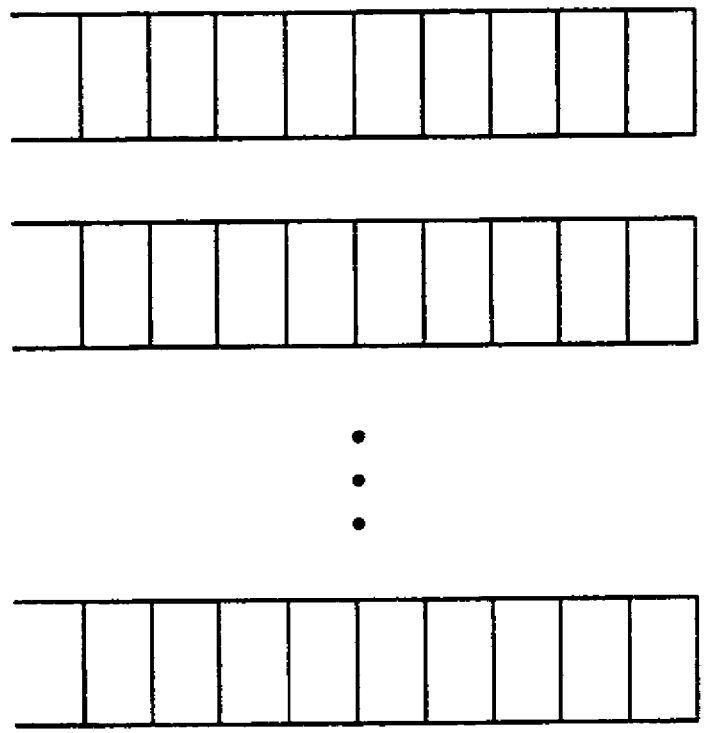
FIG. 1A is a view of queue types separated according to respective flows in a per-flow queuing method.

FIG. 1A is a view of queue types separated according to respective flows in a per-flow queuing method.

Referring to FIG. 1A, in the typical per-flow queuing method, separated queues for respective flows are prepared, and the separated queues are separately managed according to a round robin scheduling method. Thus, fair queuing is possible since the queues are managed by the round robin scheduling method. A system which uses the per-flow queuing has advantages of not only reducing a packet loss problem resulting from congestion but also reducing buffer requirements. On the other hand, there is also a disadvantage in that because the separated queues must be managed based on each flow, it is difficult to implement a fair allocation mechanism.

Figure 1B:
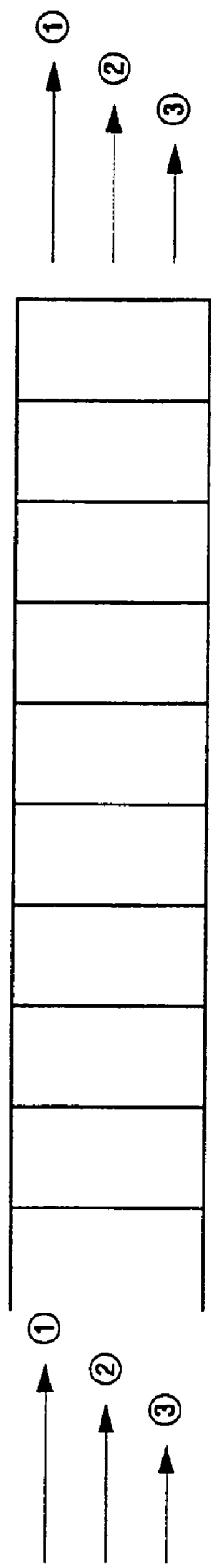
FIG. 1B is a view of a queue type in a FIFO method.

FIG. 1B is a view of a queue type in a FIFO method.

As shown in FIG. 1B, in the FIFO method, all flows flow into a single queue, and the flows are not separately managed. When congestion occurs, a packet is dropped so that a sender can be notified of the congestion, and a gateway (or router) can anticipate a network state by monitoring a queue length.

If the queue length is long and an incoming packet is dropped, the sender reacts to such a packet loss. Such a simple packet management method is called the Drop Tail method. That is, this method drops an incoming packet when a buffer is completely full. This means that a packet transmission rate depends on the performance of a link.

The present invention will now be described more fully hereinafter with reference to the accompanying drawings, in which exemplary embodiments of the present invention are shown. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. In the drawings, like numbers refer to like elements throughout the specification.

The present invention relates to an Active Flow Random Early Drop (AFRED) method which complements a Random Early Drop (RED) method. Queues are configured by combining advantages of the FIFO method and the per-flow method.

Figure 1C:
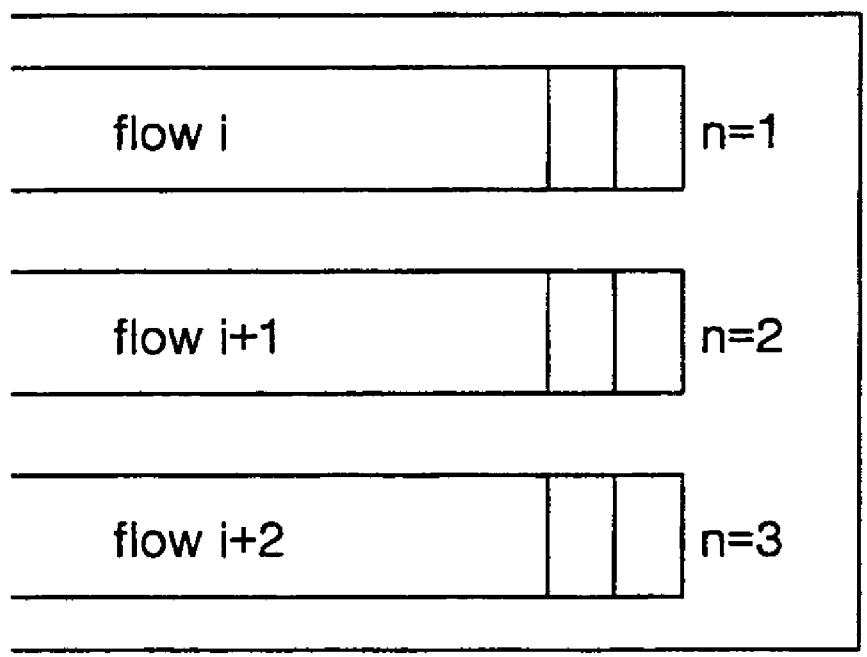
FIG. 1C is a view of management types of respective flows in a single queue according to an embodiment of the present invention.

FIG. 1C is a view of management types of respective flows in a single queue according to an embodiment of the present invention.

As shown in FIG. 1C, packets are processed according to each flow like the per-flow method, in a single queue as in the FIFO method.

Buffer allocation for a specific service is adjusted by using a bandwidth distribution of respective flows.

Thus, in order to set congestion control parameters suitable for characteristics of the flows, IDs are given to respective flows, and numbers are defined for corresponding flows.

Then, a packet drop rate is calculated according to the AFRED method. The RED method is explained below in order to help understand the AFRED method.

The RED method performs congestion control using an average queue length $Q_{avg}$ in a buffer. The average queue length $Q_{avg}$ is obtained whenever a packet arrives and is compared to a minimum queue threshold value $min_{th}$ and a maximum queue threshold value $max_{th}$ which are previously set parameters.

When the average queue length $Q_{avg}$ is smaller than the minimum queue threshold value $min_{th}$, a link use rate of a network is regarded as low, and thus all packets are normally processed, i.e., accepted.

When the average queue length $Q_{avg}$ is between the minimum queue threshold value $min_{th}$ and the maximum queue threshold value $max_{th}$, incoming packets are randomly dropped or marked with a bit, i.e., an ECN bit for a congestion notification, according to a probability Pa.

The probability Pa is in a range of from zero (0) to a maximum probability maxp which is a constant defined in the RED method. When the average queue length $Q_{avg}$ is greater than the maximum queue threshold value $max_{th}$, all of the incoming packets are dropped or marked with the ECN bit until the average queue length $Q_{avg}$ falls below the maximum queue threshold value $max_{th}$.

When the average queue length $Q_{avg}$ is obtained, an affection of a current queue length is determined by a queue weight. With the queue weight, the average queue length $Q_{avg}$ is not affected even though a queue length increases for a short time period due to temporary burst traffic.

The RED method avoids congestion by actively managing a queue of a router before all of the packets that arrive at the queue of the router (or gateway) are dropped due to network congestion.

However, one of problems of the RED method is that whether or not a packet is dropped is determined on the same basis regardless of the types of traffics (flows) which share a link of the router.

Another problem of the RED method is that a maximum probability value which is used to calculate a probability used to drop the packet or mark the packet with the ECN bit is a fixed value.

Therefore, the present invention implements the AFRED method which can calculate a packet drop rate suitable for traffic characteristics by adjusting a maximum probability value maxp, a minimum queue threshold value $min_{th}$, and a maximum queue threshold value $max_{th}$ to have different values according to respective traffic (flow) characteristics.

The AFRED operates separate RED method flow for a traffic class classified by a IP processing bit and applies different RED method parameters to respective flows.

As described above, the RED method parameters includes the maximum probability value maxp, the minimum queue threshold value $min_{th}$, and the maximum queue threshold value $max_{th}$.

If the maximum probability value maxp increases, a packet drop rate also become higher, and thus an actual queue length or an average queue length $Q_{avg}$ is decreased. Therefore, as a burst of a network becomes severe, the packet drop rate becomes higher by increasing the maximum probability value maxp, thereby leading to improved transmission efficiency.

As flow (traffic) has burst characteristics, the minimum queue threshold value $min_{th}$ is increased to maintain a high link use rate, and the maximum queue threshold value $max_{th}$ is allocated to be as small as possible. It is preferable that the maximum queue threshold value $max_{th}$ is at least twice as great as the minimum queue threshold value $min_{th}$. This is because the maximum queue threshold value $max_{th}$ acts similarly to a maximum buffer size of the drop tail method, the large value of this parameter maintains a queue length to be high, and thus a queuing delay time is increased.

Thus, the present invention provides a principal for allocating the maximum probability value maxp, the minimum queue threshold value $min_{th}$, and the maximum queue threshold value $max_{th}$ according to flow characteristics to provide fair queuing even when the FIFO queuing method is employed.

Hereinafter, an method is proposed to calculate a packet drop rate by applying RED proposed parameters corresponding to the flow characteristics based on the principal.

Figure 2:
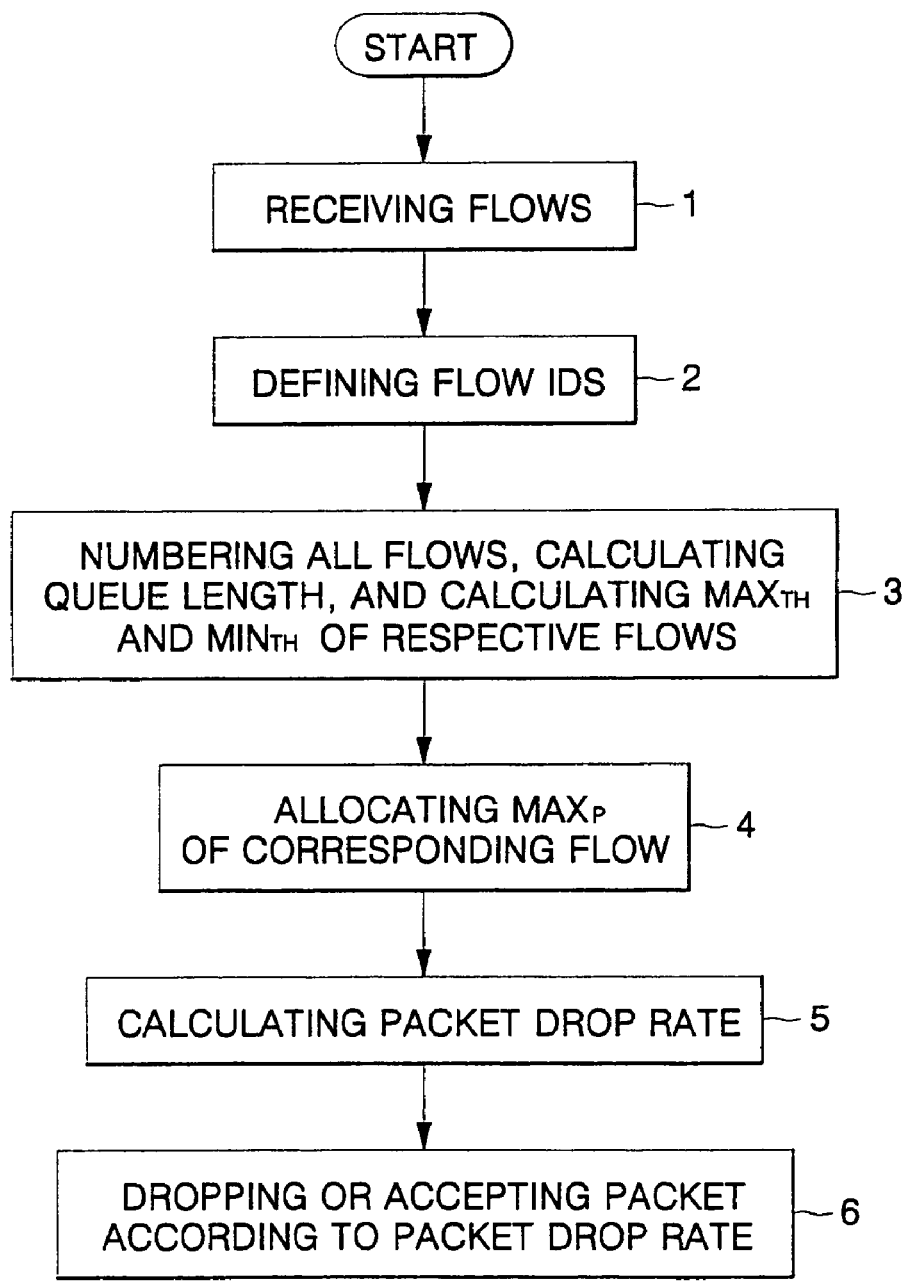
FIG. 2 is a flowchart of a process of an AFRED method in which a packet drop rate is dynamically adjusted to be suitable for a state of flow according to an embodiment of the present invention.

FIG. 2 is a flowchart of a process of an AFRED method in which a packet drop rate is actively controlled to be suitable for a state of flow according to an embodiment of the present invention.

When a packet flow is received (step 1), an ID for the received packet flow is defined (step 2).

The flow ID is defined according to a flow class classified by an IP processing bit.

Numbering is performed for each of the defined flows to identify a flow type, and a queue length of a corresponding flow is calculated. Then, a maximum queue threshold value $max_{th}$ and a minimum queue threshold value $min_{th}$ suitable for the respective flows are allocated (step 3). As the flow (traffic) has burst characteristics, the minimum queue threshold value $min_{th}$ is increased to maintain a high link use rate, and the maximum queue threshold value $max_{th}$ is allocated to be as small as possible. It is preferable that the maximum queue threshold value $max_{th}$ is at least twice as great as the minimum queue threshold value $min_{th}$.

Thereafter, a maximum probability value $max_p$ suitable for corresponding flow characteristics is allocated (step 4).

When the maximum probability value $max_p$, the maximum queue threshold value $max_{th}$ and the minimum queue threshold value $min_{th}$ are determined as described above, a packet drop probability Pa is calculated using Equation 1 (step 5):

$$Pa = max_p(Q_{avg} - min_{th})/(max_{th} - min_{th})$$ Equation 1

When the maximum probability value $max_p$ is high, the packet drop rate is applied more actively to aggressive flow which causes a packet loss of different flows, leading to fair allocation of bandwidth, since it is actively applied to flows having high transmission ability.

An incoming packet is dropped or accepted according to the packet drop rate, i.e., drop probability (step 6). A queue length of a corresponding flow should be between the maximum queue threshold value $max_{th}$ and the minimum queue threshold value $min_{th}$.

If the queue length is smaller than the minimum queue threshold value $min_{th}$, all packets should be accepted regardless of the packet drop rate, and if the queue length is greater than the maximum queue threshold value $max_{th}$, all packets should be unconditionally dropped.

A simulation is discussed below to observe effects occurring when a video service is performed using the AFRED method described above.

Figure 3:
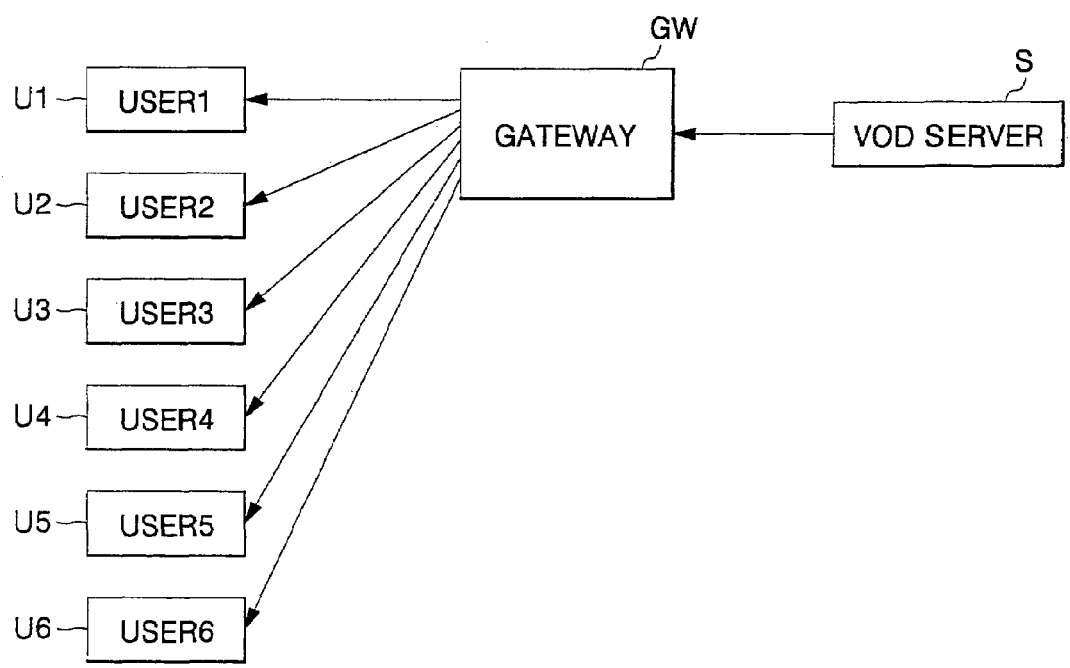
FIG. 3 is a view of a simulation for effectively securing a video stream bandwidth using the AFRED method according to an embodiment of the present invention.

FIG. 3 is a view of a simulation for effectively securing a video stream bandwidth using the AFRED method according to an embodiment of the present invention.

As shown in FIG. 3, let us assume that six users U1 to U6 are connected to a video service and that traffic flows at 10 Mbps for users U2 to U6. Also, let us assume that user U1 is guaranteed to have a minimum bandwidth for a 1 Mpbs video service and each of the flows transmits a video stream at time intervals of 0.01 sec.

The simulation configuration of FIG. 3 is to show that the AFRED method can secure a predetermined bandwidth for a video service even when a network situation is not good.

The user U1 can have a higher packet loss or a longer time delay than other links when congestion occurs in a network. However, a maximum probability value $max_p$, a maximum queue threshold value $max_{th}$ and a minimum queue threshold value $min_{th}$ are dynamically adjusted according to the AFRED method to calculate an adequate packet drop probability Pa, whereby the user U1 can be fairly allocated a bandwidth.

A simulation result of the AFRED method is shown in the following drawings.

Figure 4:
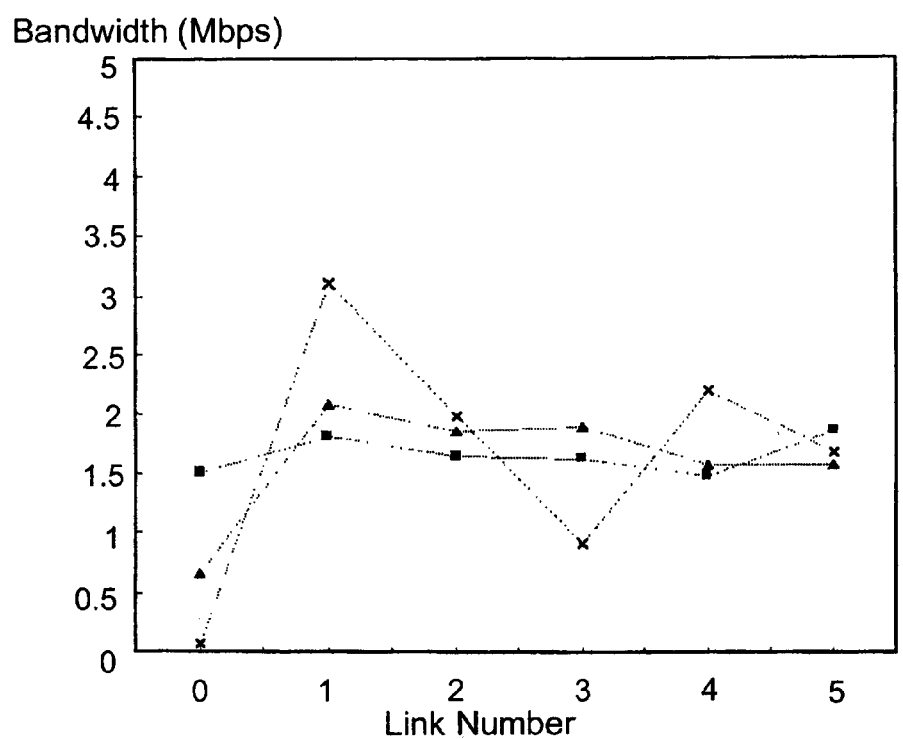
FIG. 4 is a view of a packet average output obtained from the simulation of FIG. 3.
Figure 5:
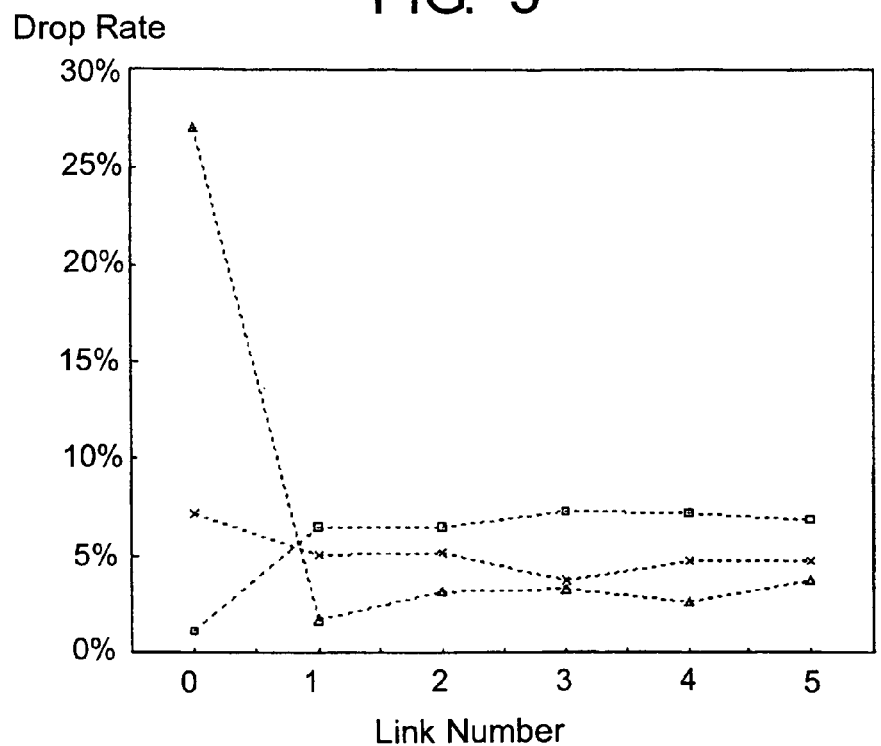
FIG. 5 is a view of a packet drop rate obtained from the simulation of FIG. 3.

FIG. 4 is a view of a packet average output obtained from the simulation of FIG. 3, and FIG. 5 is a view of a packet drop rate obtained from the simulation of FIG. 3. In FIG. 4, the solid squares represent AFRED method values, the solid triangles represent RED method values for maxp=0.02 and the x's represent FIFO method values. Similarly, in FIG. 5, the squares represent AFRED method values, the x's represent RED method values for maxp=0.02 and the triangles represent FIFO method values.

A packet average output result is shown in FIG. 4 as follows. In the FIFO method, it is difficult for a user U1 to be provided with a video service because a very low bandwidth is allocated compared to other users U2 to U6. In the RED method, a relatively fair bandwidth allocation is performed compared to the FIFO method, but a very low bandwidth is allocated to the user U1 compared to the other users U2 to U6.

That is, the user U1 cannot be allocated even a minimum bandwidth for a video service that requires 1 Mbps, and thus the user U1 cannot be provided with a smooth video service.

In the AFRED method, all users are allocated almost equal bandwidth, and so all users including the user U1 can be provided with the smooth video service.

As to a packet drop rate, as shown in FIG. 5, in the AFRED method, packets are dropped at almost equal packet drop rates for all users.

Through FIGS. 4 and 5, it can be seen that a packet drop method which is proportional to the bandwidth used can not provide a fair bandwidth within equipment. That is, a selective packet drop method is needed when a specific network link requires a minimum bandwidth.

As described hereinbefore, the packet congestion control method of the present invention dynamically adjusts congestion control parameters to be suitable for a network congestion situation, thereby having an effect similar to the per-flow queuing. Also, a router (or gateway) which employs the AFRED method allocates an adequate bandwidth according to traffic characteristics, and thus users can be provided with a smooth video service.

What is claimed is:

1. A packet congestion control method comprising:
    defining identifiers for a received at least one packet flow upon receiving the at least one packet flow;
    calculating a queue length of each of the at least one packet flow;
    allocating differently a maximum queue threshold value, a minimum queue threshold value, and a maximum probability value for each of the at least one packet flow, the maximum probability value being set to be as high as possible upon the at least one packet flow having burst characteristics;
    setting a packet drop probability for each of the at least one packet flow in accordance with the maximum queue threshold value, the minimum queue threshold value, and the maximum probability value allocated differently for each of the at least one packet flow; and
    dropping or accepting an incoming packet of a flow according to the set packet drop probability.

2. The method of claim 1,
    dropping or accepting an incoming packet of a flow according to the set packet drop probability upon a queue length of a currently received packet being between the maximum queue threshold value and the minimum queue threshold value.

3. The method of claim 1, accepting all incoming packets of a flow regardless of the packet drop probability upon a queue length of a currently received packet being smaller than the minimum queue threshold value $min_{th}$.

4. The method of claim 1,
    dropping all incoming packets of a flow regardless of the packet drop probability upon a queue length of a currently received packet being greater than the maximum queue threshold value $max_{th}$.

5. The method of claim 4, wherein each identifier is defined according to a traffic class.

6. The method of claim 1, wherein the minimum queue threshold value is increased to maintain a high use efficiency of a link, and the maximum queue threshold value is allocated to be as small as possible and at least twice as great as the minimum queue threshold value upon the at least one packet flow having burst characteristics.

7. The method of claim 1,
    wherein, upon receiving the at least one packet flow:
    defining identifiers for the received at least one packet flow; and
    numbering each of the received at least one packet flow defined with the identifiers.

8. The method of claim 1, wherein the maximum probability value is increased to increase a packet drop rate upon the at least one packet flow having severe burst characteristics.

9. A program storage device, readable by a machine, tangibly embodying a program of instructions executable by the machine to perform a packet congestion control method comprising:
    defining identifiers for a received at least one packet flow upon receiving the at least one packet flow;
    calculating a queue length of each of the at least one packet flow;
    allocating differently a maximum queue threshold value, a minimum queue threshold value, and a maximum probability value for each of the at least one packet flow, the maximum probability value being set to be as high as possible upon the at least one packet flow having burst characteristics;
    setting a packet drop probability for each of the at least one packet flow in accordance with the maximum queue threshold value, the minimum queue threshold value, and the maximum probability value allocated differently for each of the at least one packet flow; and
    dropping or accepting an incoming packet of a flow according to the set packet drop probability.

10. The program storage device of claim 9, wherein the packet congestion control method further comprises:
    dropping or accepting an incoming packet of a flow according to the set packet drop probability upon a queue length of a currently received packet being between the maximum queue threshold value and the minimum queue threshold value.

11. The program storage device of claim 9, wherein the a packet congestion control method further comprises:
    accepting all incoming packets of a flow regardless of the packet drop probability upon a queue length of a currently received packet being smaller than the minimum queue threshold value $min_{th}$.

12. The program storage device of claim 9, wherein the a packet congestion control method further comprises:
    dropping all incoming packets of a flow regardless of the packet drop probability upon a queue length of a currently received packet being greater than the maximum queue threshold value $max_{th}$.

13. The program storage device of claim 12, wherein each identifier is defined according to a traffic class.

14. The program storage device of claim 9, wherein upon the at least one packet flow having burst characteristics, the minimum queue threshold value is increased to maintain a high use efficiency of a link, and the maximum queue threshold value is allocated to be as small as possible and at least twice as great as the minimum queue threshold value.

15. The program storage device of claim 9,
    wherein, upon receiving the at least one packet flow:
    defining identifiers for the received at least one packet flow; and
    numbering each of the received at least one packet flow defined with the identifiers.

16. The program storage device of claim 9, wherein upon the at least one packet flow having severe burst characteristics, the maximum probability value is increased to increase a packet drop rate.

* * * * *

UNITED STATES PATENT AND TRADEMARK OFFICE
CERTIFICATE OF CORRECTION

PATENT NO.       : 7,636,308 B2
APPLICATION NO. : 11/033536
DATED            : December 22, 2009
INVENTOR(S)      : Il-Won Kwon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1171 days.

Signed and Sealed this

Twenty-first Day of December, 2010

David J. Kappos
*Director of the United States Patent and Trademark Office*